July 5, 1932. L. C. THACKER 1,866,276
PEANUT DIGGER
Filed Dec. 16, 1929 2 Sheets-Sheet 1
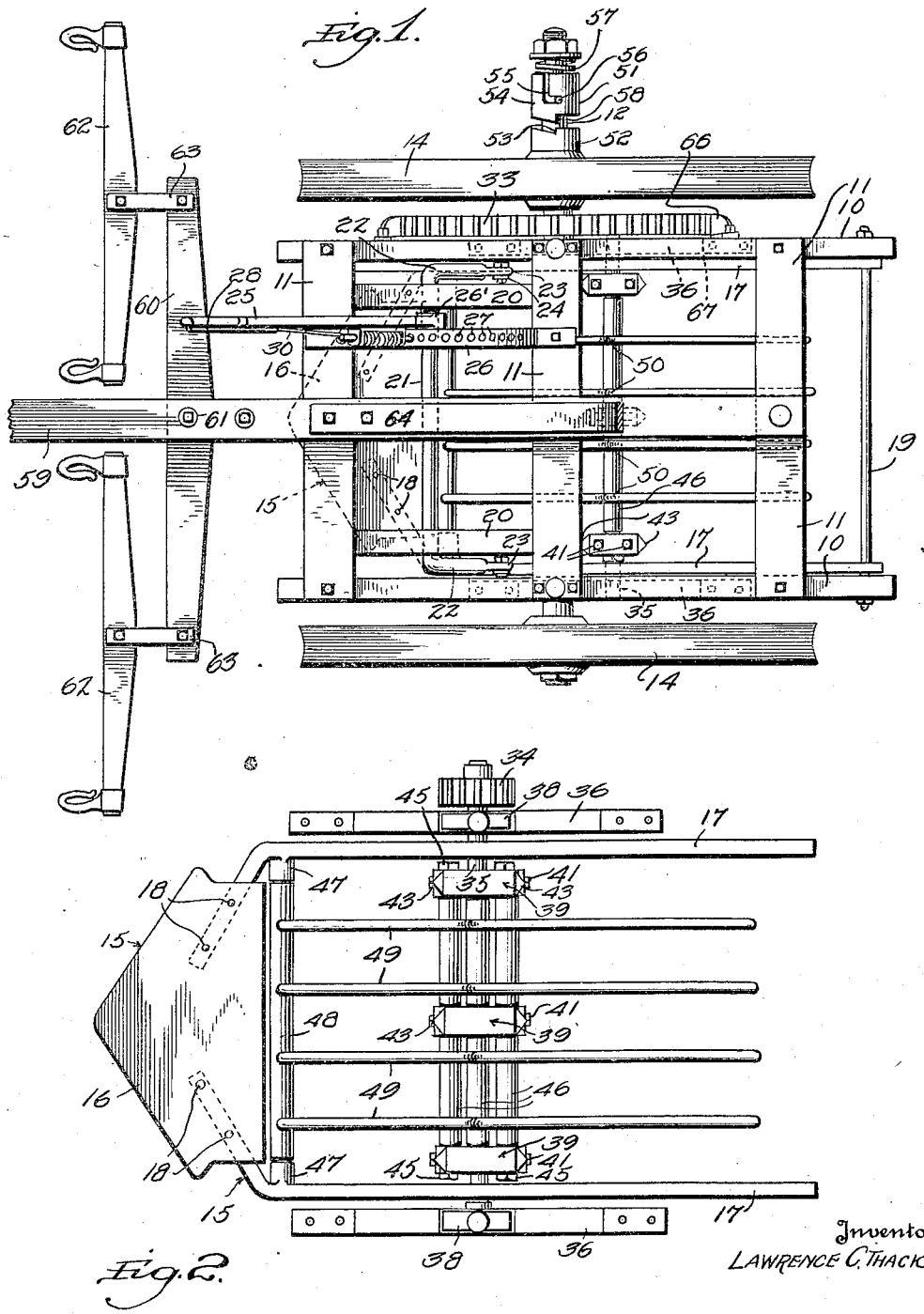
Inventor
LAWRENCE C. THACKER Inventor
LAWRENCE C. THACKER
By C. L. Parker Jr.
Attorney Patented July 5, 1932

1,866,276

UNITED STATES PATENT OFFICE

LAWRENCE C. THACKER, OF SMITHFIELD, VIRGINIA

PEANUT DIGGER

Application filed December 16, 1929. Serial No. 414,525.

This invention relates to improvements in a machine for digging peanut plants and other similar plants from the ground.

An object of the invention is to provide a machine of the character referred to having wheels for movement over the ground and having a plow adjustable to various heights to uproot plants as a whole from the ground.

Another object is to provide novel means for conveying the uprooted plants through the machine, said means being operable through a releasable clutch connection associated with the traction wheels.

A further object is to provide novel means for shaking or knocking the dirt from the roots of the plants as they pass through the machine.

Other objects and advantages of the invention will become apparent during the course of the following description.

Figure 3:
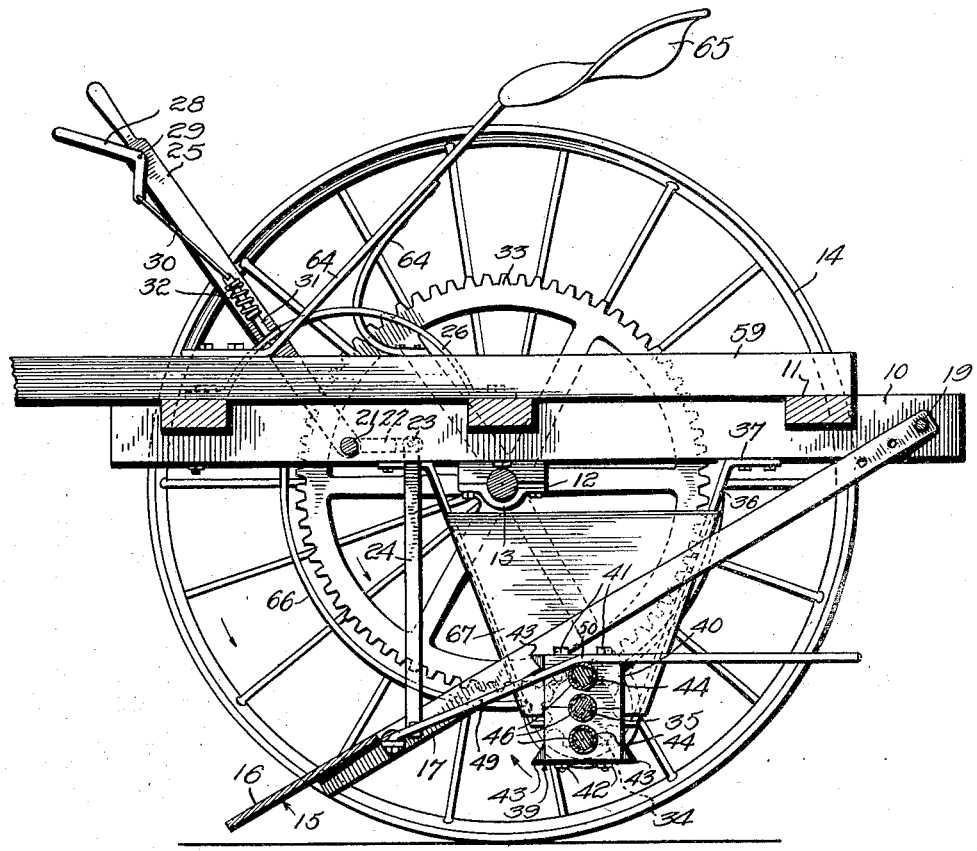
Figure 4:
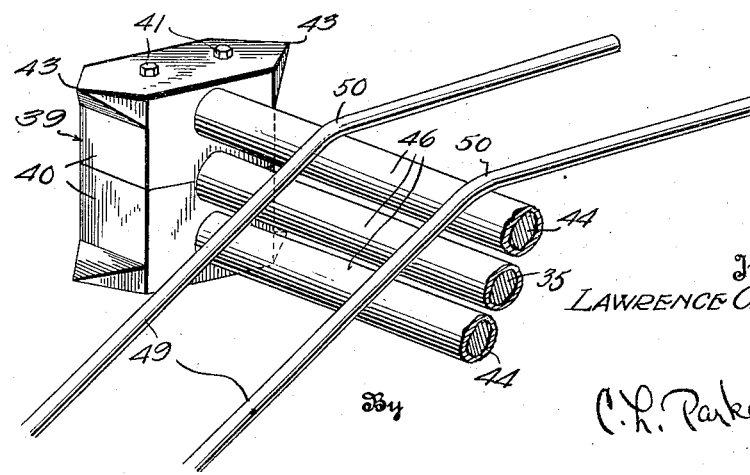

In the drawings I have shown a preferred embodiment of my invention. In this showing, Figure 1 is a plan view of the machine as a whole, Figure 2 is a plan view of the plow and shaker, Figure 3 is a central vertical sectional view through the machine with parts broken away, and Figure 4 is a perspective view of a portion of the conveying and shaking means.

Referring to the drawings the numeral 10 indicates a pair of side frame members connected together by cross frame members 11. A shaft 12 arranged transversely of the frame is journaled in suitable bearings 13 carried substantially centrally of the side frame members 10 and traction wheels 14 are freely mounted for rotation on the shaft 12.

A plow indicated as a whole by the numeral 15, is carried by the frame and is adapted to be adjusted whereby the point thereof enters the ground a sufficient depth to uproot plants such as peanut plants, as a whole. As shown, the plow, comprises a pointed plate 16 which is adapted to enter the ground and a pair of side arms 17 are connected to the plate 16 as indicated at 18. The arms 17 extend rearwardly and their extremities are pivotally mounted on a rod 19 extending between the side members 10. The plow is adapted to be connected to the frame as shown in Figure 3 whereby it is arranged angularly with the plate 16 entering the ground at an angle.

Means are provided for adjusting the plow to various heights in order to permit the plow point to pierce the ground to various depths. As shown in Figure 1, a pair of reinforcing frame members 20 are arranged between the front and center cross members 11 and a rod 21 having its extremities turned rearwardly as indicated at 22 is pivotally mounted in the members 20. The ends of the rod 21 are pivotally connected as at 23 to one end of rods 24, the opposite end of the latter rods being connected to the side arms 17 of the plow a short distance rearwardly of the plate 16. An operating handle 25 is rigidly secured to the rod 21 as at 26'. The rod 21, its end portions 22 and the handle 25 form in effect a bell-crank lever which pivots in the bearings for the rod 21 and obviously the plow will be raised and lowered as the handle 25 is moved. In order to secure the plow in selected positions I provide an arcuate strip 26 arranged between the forward and central frame members 11 and this strip is provided with a plurality of openings 27. A handle 28 in the form of a bell-crank lever is pivotally secured as at 29 to the handle 25 and the lower end of the lever 28 is connected by a rod 30 to the upper end of a pin 31 which is mounted for sliding movement in and out of the openings 27. A spring 32 is preferably utilized to urge the pin 31 downwardly. It will be apparent that with the operating handle in the position shown in Figure 3 the pin 31 may be raised by movement of the lever 28 and the handle 25 may be swung until the plow is in the desired position. When the lever 28 is released the pin 31 will immediately be urged into an adjacent opening 27.

As the machine moves over the ground and the plow uproots plants as a whole the plants will be moved rearwardly a short distance by coming in contact with additional plants, but in order to insure further rearward movement it is necessary to provide some positive conveying means for the plants. It is also necessary to knock the dirt from the roots of the plants as they pass through the machine in order the subsequent operations to the plants may be expedited. Accordingly, I have provided means for accomplishing these objects. A large gear 33 is rigidly secured to the shaft 12 outwardly of one frame member 10 and this gear meshes with a small gear 34 mounted upon a shaft 35 arranged adjacent the bottom of the machine. As shown, a pair of downwardly extending brackets 36 are secured at their upper ends to the frame members 10 as at 37 and the lower portion of these brackets carries bearings 38 in which shaft 35 is journaled.

A plurality of blocks indicated as a whole by the numeral 39 are rigidly secured at spaced intervals to the shaft 35. As shown in Figure 4 each block 39 comprises a pair of complementary sections 40 which are secured together by means of bolts 41 extending therethrough and having nuts 42 threaded on the bolts. Any suitable means such as keys (not shown) may be used to secure the blocks 39 to the shaft 35. Each block is provided with a plurality of outwardly extending fingers 43 for a purpose to be described.

Referring to Figure 2, the blocks 39 have a plurality of shaft 44 (see Figure 4) extending therethrough in alinement with and on opposite sides of the shaft 35. These shafts 44 may be suitably secured to the outer blocks 39 as indicated at 45 (see Figure 2) and are adapted to rotate with the blocks 39 around the shaft 35. There is no relative movement between the blocks 39 and the shafts 44. As shown in Figures 2 and 4, a plurality of rollers 46 are mounted between each pair of blocks on the shafts 35 and 44. These rollers lightly engage the shafts and are utilized for a purpose to be described.

The arms 17 of the plow are provided with inwardly directed extensions 47 (see Figure 2) in which the ends of a shaft 48 are pivotally mounted. At spaced intervals on the shaft 48 one end of a plurality of longitudinally extending rods 49 are rigidly secured. The opposite ends of the rods 49 are free and substantially centrally thereof the rods are bent angularly as shown at 50. In the embodiment shown the rods are arranged above the rollers 46 and as the shaft 35 rotates it will be apparent that the rods 49 will be reciprocated up and down.

It is not always desirable to operate the conveying and shaking means just described and accordingly I provide a clutch construction indicated by the numeral 51 by which the shaft 12 carrying the gear 33 may be connected to and disconnected from one of the traction wheels 14. Any suitable clutch construction may be used, but as shown in Figure 1, I provide a collar 52 secured to the hub of one of the wheels 14 and provided with a cut-out portion 53. A sleeve 54 provided with a bayonet slot 55 is slidably mounted on the shaft 12, and a pin 56 carried by the shaft is movable in the bayonet slot to permit sliding movement of the sleeve. A spring 57 surrounds the shaft to normally urge the sleeve into engagement with the collar and the sleeve is provided with a cut-out portion 58 adapted to engage the cut-out portion 53 whereby the shaft 12 and wheel 14 may be connected together to rotate as a unit. Rotation of the sleeve with the shaft is accomplished by means of the pin 56 as will be understood.

Any suitable means may be used for pulling the machine. As shown, a tongue 59 is connected to the frame members 11 substantially centrally thereof and extends forwardly of the machine. A doubletree 60 may be pivotally secured to the tongue 59 as at 61 and a pair of singletrees 62 may be secured to the doubletree as at 63. This construction preferably is used when animals such as horses are used to move the machine, but it will be obvious that a tractor or any other suitable means may be utilized.

If desired, a driver's seat may be arranged on the machine. Preferably, a pair of supports 64 are secured to the top of the tongue 59 at a convenient location over the machine and a seat 65 is secured to the upper end of the supports.

In order to prevent parts of the plants from becoming entangled in the gears of the machine, I provide a circular guard 66 arranged outwardly of the lower half of the gears 33 and 34. Also, I prefer to arrange a guide plate 67 between the arms of each bracket 36 (see Figure 3). The plates 67 guide the plants while they move rearwardly through the machine and also prevent entanglement with the gears.

The operation of the device is as follows:

The machine is arranged to straddle a row of plants which are to be uprooted. The plow 15 is adjusted to a suitable height to engage the roots of the plants and the clutch mechanism is connected whereby the conveying and shaking means will be operated through the traction wheels as the machine moves over the ground. The uprooted plants move rearwardly through the machine a short distance by contact with subsequently uprooted plants and as the plants pass over the rods 49, the dirt is shaken and knocked from the roots by the up and down movement of the rods. The blocks 39 are rotating continuously and as the plants move rearwardly through the machine, the fingers 43 engage the roots and assist in conveying the plants to a position beyond the ends of the rods 49 when the plants will fall to the ground and be gathered for subsequent operations.

The bends 50 in the rods 49 permit the free extremities of the rods to be arranged in a horizontal plane instead of in an upwardly inclined position and thus the movement of the plants after they have been engaged by the fingers 43 is along a horizontal plane.

The provision of the rollers 46 serves to assist in conveying the plants through the machine and it will be obvious that reciprocation of the rods 49 is positive whereby the greater part, if not all, of the dirt is shaken or knocked from the roots.

It is believed to be apparent that I have provided a machine by which peanut plants and the like may be quickly uprooted, the dirt removed from the roots, and the plant dropped from the machine to be gathered for later operations.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. A device of the character described comprising a frame, traction means for moving said frame, a plow carried by said frame and adapted to uproot plants as a whole, a shaft associated with said traction means, a plurality of spaced rotatable members mounted on said shaft each provided with a plurality of outwardly extending fingers adapted to engage said plants to convey the latter through the device, means for knocking the dirt from the roots of said plants as they pass through the device, and means for operating said last named means comprising a plurality of spaced rollers arranged between said rotatable members and adapted to rotate therewith.

2. A device of the character described comprising a frame, traction means for said frame, a plow carried by said frame and adapted to uproot plants as a whole, a shaker formed of a plurality of rods arranged longitudinally to receive plants from said plow, means for conveying the plants rearwardly over said rods, means carried by said conveying means for operating said shaker rods and comprising a plurality of rollers arranged to transmit oscillatory movement to said rods, and common means for operating said conveying means and said last named means.

3. A device of the character described comprising a frame, a plow carried by said frame and adapted to uproot plants as a whole, a drive shaft rotatably supported by said frame and extending transversely thereof, a pair of actuating shafts arranged on opposite sides of said drive shaft and bodily rotatable therewith about the axis thereof, rollers surrounding said actuating shafts, a plurality of shaker rods extending longitudinally of said frame and pivotally supported to swing about a transverse axis at their forward ends adjacent the rear end of said plow, said rods being supported rearwardly of the forward ends thereof on said rollers to be oscillated thereby upon rotation of said drive shaft and means rotatable by said drive shaft for effecting rearward movement of plants on said rods.

4. A device constructed in accordance with claim 3 provided with a plurality of blocks connecting said actuating shafts to said drive shaft and arranged out of the vertical plane of said rods, the means for effecting rearward movement of the plants comprising fingers carried by said blocks.

In testimony whereof I affix my signature.

LAWRENCE C. THACKER.